(12) United States Patent
Kang et al.

(10) Patent No.: US 12,536,070 B2
(45) Date of Patent: Jan. 27, 2026

(54) MEMORY DEVICE, OPERATING METHOD OF MEMORY DEVICE, AND MEMORY SYSTEM INCLUDING MEMORY DEVICE

(71) Applicant: Samsung Electronics Co., Ltd., Suwon-si (KR)

(72) Inventors: Seongmuk Kang, Suwon-si (KR); Yeonggeol Song, Suwon-si (KR); Kijun Lee, Suwon-si (KR); Myungkyu Lee, Suwon-si (KR); Kyomin Sohn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/786,481

(22) Filed: Jul. 27, 2024

(65) Prior Publication Data

US 2025/0238317 A1    Jul. 24, 2025

(51) Int. Cl.
| | |
|---|---|
| *G06F 11/10* | (2006.01) |
| *G11C 29/42* | (2006.01) |
| *G11C 29/52* | (2006.01) |
| *H03M 13/15* | (2006.01) |

(52) U.S. Cl.
CPC ...... *G06F 11/1068* (2013.01); *G06F 11/1016* (2013.01); *G06F 11/1048* (2013.01); *G11C 29/42* (2013.01); *G11C 29/52* (2013.01); *H03M 13/1525* (2013.01); *H03M 13/153* (2013.01); *H03M 13/1545* (2013.01); *H03M 13/1575* (2013.01)

(58) Field of Classification Search
CPC ............ G06F 11/1068; G06F 11/1016; G06F 11/1048; G11C 29/42; G11C 29/52; H03M 13/1525; H03M 13/153; H03M 13/1545; H03M 13/1575
USPC ........ 714/764, 768, 782, 784, 793, 799, 800
See application file for complete search history.

(56) References Cited

U.S. PATENT DOCUMENTS

| | | | |
|---|---|---|---|
| 5,099,482 A | 3/1992 | Cameron | |
| 6,446,236 B1 * | 9/2002 | McEwen | ............... H03M 13/45 714/763 |
| 6,615,387 B1 | 9/2003 | Williamson et al. | |
| 6,990,624 B2 | 1/2006 | Dohmen et al. | |
| 7,278,086 B2 | 10/2007 | Banks et al. | |
| 7,328,395 B1 | 2/2008 | Burd | |

(Continued)

OTHER PUBLICATIONS

Cojocar et al., Exploiting Correcting Codes: On the Effectiveness of ECC Memory Against Rowhammer Attacks, 2019. IEEE, pp. 55-71. (Year: 2019).*

*Primary Examiner* — John J Tabone, Jr.
(74) *Attorney, Agent, or Firm* — Muir Patent Law, PLLC

(57) ABSTRACT

A memory device includes a memory cell array that includes a plurality of memory cells disposed in a plurality of rows, an eraser detector that stores vulnerable row data including a location of an estimation error corresponding to a vulnerable row among the plurality of rows, an error correction code (ECC) engine that decodes first data read from the memory cell array based on the vulnerable row data to generate information on a first error included in the first data in response to a read command and corrects the first error to generate second data, and a flag generator that generates a decoding flag indicating a decoding state of the ECC engine based on the vulnerable row data, the information on the first error, and the second data.

20 Claims, 11 Drawing Sheets

(56) References Cited

U.S. PATENT DOCUMENTS

| | | | |
|---|---|---|---|
| 7,404,133 B2 | 7/2008 | McClellan et al. | |
| 10,804,935 B2 | 10/2020 | Kwok | |
| 2003/0106014 A1 | 6/2003 | Dohmen et al. | |
| 2006/0156175 A1 | 7/2006 | McClellan et al. | |
| 2006/0174181 A1 | 8/2006 | Banks et al. | |
| 2019/0044541 A1 | 2/2019 | Kwok | |
| 2019/0340067 A1* | 11/2019 | Kim | G06F 13/1668 |
| 2020/0159617 A1* | 5/2020 | Cha | G06F 11/1068 |
| 2021/0004289 A1* | 1/2021 | Lee | G06F 11/1012 |
| 2022/0180958 A1* | 6/2022 | Kim | G11C 29/18 |
| 2022/0374309 A1* | 11/2022 | Kim | G06F 11/1048 |
| 2022/0405165 A1* | 12/2022 | Song | G11C 29/14 |
| 2023/0004308 A1* | 1/2023 | Kim | G06F 3/0655 |
| 2023/0163786 A1* | 5/2023 | Kim | H03M 13/1585 714/764 |
| 2024/0178861 A1* | 5/2024 | Kim | H03M 13/152 |
| 2024/0281323 A1* | 8/2024 | Lee | G06F 11/1044 |
| 2025/0238317 A1* | 7/2025 | Kang | G06F 11/1068 |

\* cited by examiner

MEMORY DEVICE, OPERATING METHOD OF MEMORY DEVICE, AND MEMORY SYSTEM INCLUDING MEMORY DEVICE

CROSS-REFERENCE TO RELATED APPLICATION(S)

This application claims priority to and the benefit of Korean Patent Application No. 10-2024-0008047, filed on Jan. 18, 2024 in the Korean Intellectual Property Office, the disclosure of which is incorporated herein by reference in its entirety.

BACKGROUND

(a) Field

The present disclosure relates to a memory device, an operating method of the memory device, and a memory system including the memory device.

(b) Description of the Related Art

A memory device widely used in a high-performance electronic system is increasing in integration and speed, and a manufacturing process of the memory device is also being refined. As a scale of the process is reduced, a bit error rate may rapidly increase, and a yield may decrease. Accordingly, a method for increasing reliability of the memory device is needed.

On the other hand, a dynamic random access memory (DRAM) device includes an error correction code (ECC) circuit to improve reliability of stored data. The ECC circuit may correct an error in data stored in the DRAM device. However, if the error in the data exceeds error correction capability of the ECC circuit, a Silent Data Corruption (SDC) phenomenon in which the error is not detected or corrected from the data may occur. Therefore, it is useful to reduce the SDC phenomenon by improving the error determination.

SUMMARY

An embodiment according to the present disclosure is to provide a memory device and a memory system with improved reliability.

An embodiment according to the present disclosure is to provide a memory device and a memory system that prevent or reduce a Silent Data Corruption (SDC) phenomenon.

A memory device according to an embodiment includes a memory cell array including a plurality of memory cells arranged in a plurality of rows, an eraser detector configured to store vulnerable row data including a location of an estimation error corresponding to a vulnerable row among the plurality of rows, an error correction code (ECC) engine configured to decode first data read from the memory cell array based on the vulnerable row data to generate information on a first error included in the first data in response to a read command and corrects the first error to generate second data, and a flag generator configured to generate a decoding flag indicating a decoding state of the ECC engine based on the vulnerable row data, the information on the first error, and the second data.

An operating method of the memory device including a memory cell array, the operating method according to an embodiment includes receiving first data read from the memory cell array including a plurality of memory cells arranged in a plurality of rows in response to a read command, generating a first syndrome for the first data, generating information on a first error included in the first data based on the first syndrome and vulnerable row data including a location of an estimation error corresponding to a vulnerable row among the plurality of rows, generating second data by correcting the first error, and generating a decoding flag indicating a decoding state based on the vulnerable row data, the information on the first error, and the second data.

A memory system according to an embodiment includes a memory controller configured to transmit a read command and receives a decoding flag indicating a decoding state of a memory device in response to the read command, and a memory device including a memory cell array having a plurality of memory cells arranged in a plurality of rows. The memory device is configured to read first data from the memory cell array in response to the read command, decode the first data based on vulnerable row data including a location of an estimation error corresponding to a vulnerable row among the plurality of rows to generate information on a first error included in the first data, correct the first error to generate second data, and generate the decoding flag indicating the decoding state based on the vulnerable row data, the information on the first error, and the second data.

DETAILED DESCRIPTION OF THE EMBODIMENTS

Figure 1:
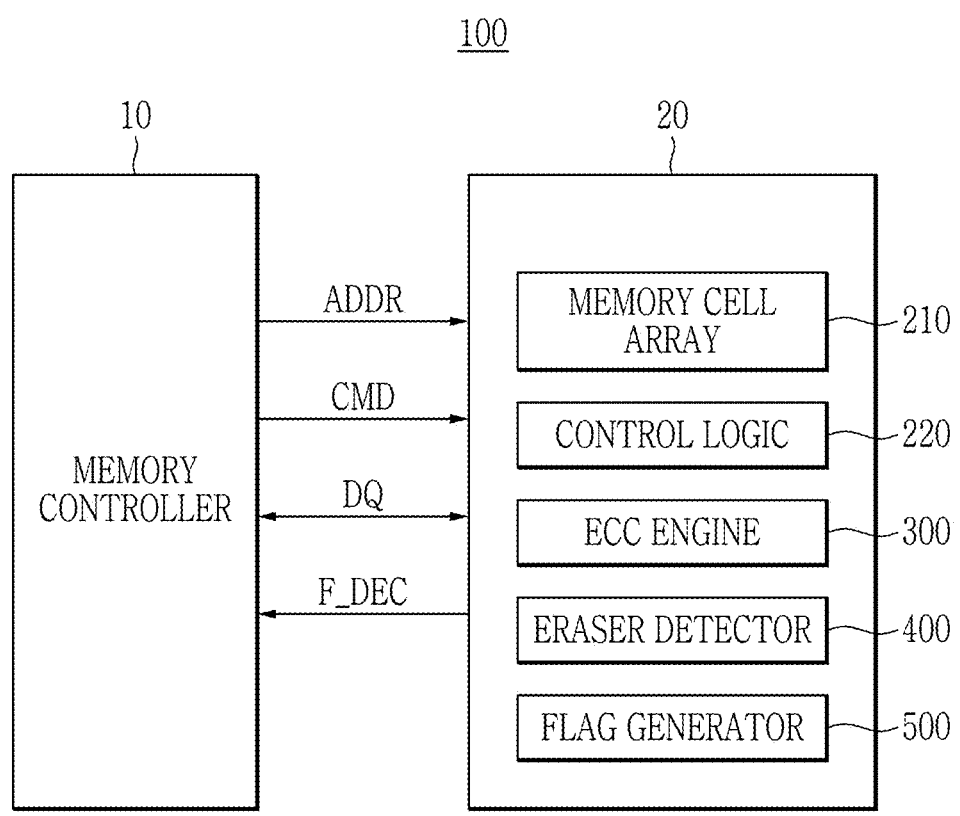
FIG. 1 is a view showing a memory system according to an embodiment.

An embodiment of the present disclosure will be described more fully hereinafter with reference to the accompanying drawings so that those skilled in the art easily implement the embodiments. The present disclosure may be modified in various different ways, all without departing from the spirit or scope of the present invention.

In order to clearly describe the present disclosure, a portion that is not related to the description of the present disclosure is omitted from the drawings. Like reference numerals designate like elements throughout the specification. In the flowchart described with reference to the drawings, an order of operations may be changed, various operations may be merged, a certain operation may be divided, and a certain operation may not be performed.

In addition, a singular form may be intended to include a plural form as well, unless the explicit expression such as "one" or "single" is used. Terms including ordinal numbers such as first, second, and the like will be used only to describe various constituent elements, and are not to be interpreted as limiting these constituent elements. These terms may be used for a purpose of distinguishing one constituent element from other constituent elements.

Figure 2:
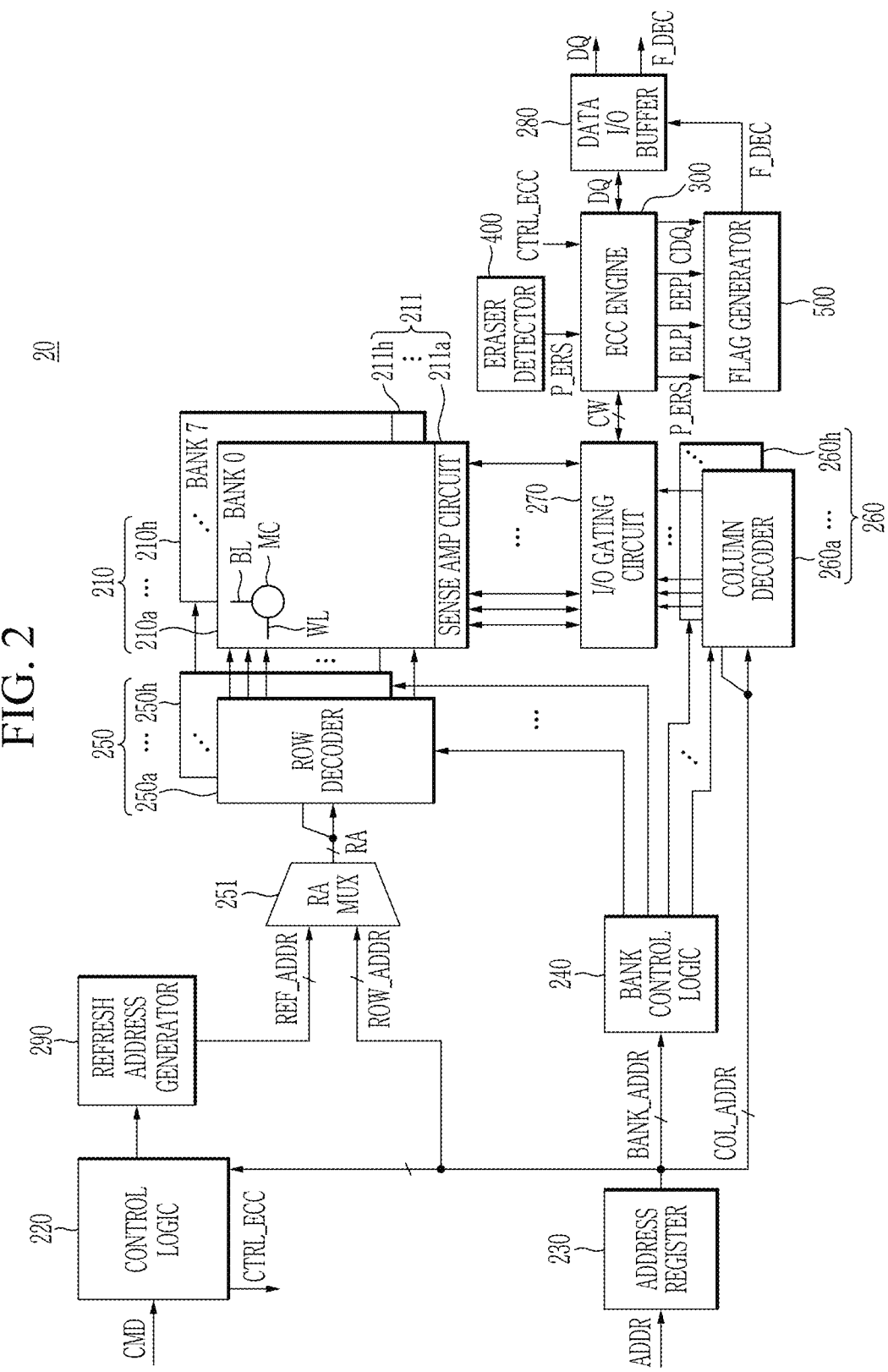
FIG. 2 is a view showing a memory device of FIG. 1 according to an embodiment.

FIG. 1 is a view showing a memory system according to an embodiment. FIG. 2 is a view showing a memory device of FIG. 1 according to an embodiment.

Referring to FIG. 1, a memory system 100 may include a memory controller 10 and a memory device 20.

The memory controller 10 may access the memory device 20 according to a request from a host. The memory controller 10 may communicate with the host using various protocols. For example, the memory controller 10 may write data in the memory device 20 or may read data from the memory device 20 in response to the request from the host.

In an embodiment, the memory controller 10 may be connected to the memory device 20 through a memory interface to exchange signals through the memory interface. The memory controller 10 may control a memory operation of the memory device 20 by providing a signal to the memory device 20. The signal may include a command CMD and an address ADDR. The command CMD may include an activate command, a read/write command, and a refresh command. The activate command may be a command that activates a target row of a memory cell array 210 in order to write data in the memory cell array 210 or read data from the memory cell array 210. The read/write command may be a command for performing a read or write operation in a target memory cell of the activated row. The refresh command may be a command for performing a refresh operation in the memory cell array 210.

The memory controller 10 may provide the command CMD and the address ADDR to the memory device 20 to access the memory cell array 210, and may control the memory operation such as reading data from the memory cell array 210 or writing data in the memory cell array 210. Data DQ may be transferred from the memory cell array 210 to the memory controller 10 according to the read operation, and data DQ may be transferred from the memory controller 10 to the memory cell array 210 according to the write operation.

The memory device 20 may be a storage device based on a semiconductor device. In an embodiment, the memory device 20 may be a dynamic random access (DRAM) memory, a double data rate 4 (DDR4) synchronous DRAM (SDRAM) memory, a low power DDR4 (LPDDR4) SDRAM memory, an LPDDR5 SDRAM memory, a DDR5 SDRAM memory, or a graphic DDR (GDDR) memory that includes dynamic memory cells.

In response to the address ADDR and the command CMD received from the memory controller 10, the memory device 20 may receive or output data DQ through data lines, and may perform the refresh operation. Additionally, the memory device 20 may transmit a decoding flag F_DEC to the memory controller 10. The memory controller 10 may determine a decoding state of the memory device 20 based on the decoding flag F_DEC. For example, if the memory controller 10 receives the decoding flag F_DEC having an enable level, it may determine that the data DQ received from the memory device 20 includes an uncorrectable error.

If the memory controller 10 receives the decoding flag F_DEC having a disabled level, it may determine that the data DQ received from the memory device 20 does not include an error or includes an error corrected.

Referring to FIG. 2 together with FIG. 1, the memory device 20 may include the memory cell array 210, a sense amplifier 211, a control logic 220, an address register 230, a row decoder 250, a column decoder 260, an input/output (I/O) gating circuit 270, a data I/O buffer 280, and a refresh address generator 290.

The memory cell array 210 may include a plurality of memory cells MC defined by a plurality of rows and a plurality of columns. In an embodiment, the memory cell array 210 may include a plurality of memory banks 210a-210h. Although eight memory banks (BANK0-BANK7) 210a-210h are shown in FIG. 2, the number of the memory banks is not limited thereto. Each of the memory banks 210a-210h may include a plurality of rows, a plurality of columns, and the plurality of memory cells MC disposed at intersections (or intersecting points) of the plurality of rows and the plurality of columns. In an embodiment, the plurality of rows may be defined by the plurality of word lines WL, and the plurality of columns may be defined by the plurality of bit lines BL.

The control logic 220 may control an overall operation of the memory device 20. Specifically, the control logic 220 may generate a control signal so that the memory device 20 performs the read operation, the write operation, or the refresh operation. In an embodiment, the control logic 220 may include a command decoder for decoding the command CMD and a mode register for setting an operation mode of the memory device 20. The control logic 220 may control the refresh address generator 290 to generate a refresh row address REF_ADDR in response to the refresh command. The control logic 220 may generate an error correction code (ECC) control signal CTRL_ECC that controls an ECC engine 300.

The address register 230 may receive the address ADDR. The address ADDR may include a row address ROW_ADDR indicating a row of the memory cell array 210 and a column address COL_ADDR indicating a column of the memory cell array 210. The address register 230 may provide a bank address BANK_ADDR to a bank control logic 240. The address register 230 may provide the row address ROW_ADDR to the control logic 220 and a row address multiplexer 251. The address register 230 may provide the column address COL_ADDR to the column decoder 260. In example embodiments, the address register 230 may provide the column address COL_ADDR and the bank address BANK_ADDR to the control logic 220.

The bank control logic 240 may generate bank control signals based on the bank address BANK_ADDR received from the address register 230. Based on the bank control signal, a row decoder corresponding to the bank address BANK_ADDR among first to eighth row decoders 250a-250h may be activated, and a column decoder corresponding to the bank address BANK_ADDR among first to eighth column decoders 260a-260h may be activated.

The refresh address generator 290 may generate the refresh row address REF_ADDR for refreshing the memory cells. The refresh address generator 290 may provide the refresh row address REF_ADDR to the row address multiplexer 251. Accordingly, the memory cells disposed at the word line corresponding to the refresh row address REF_ADDR may be refreshed.

The row address multiplexer 251 may receive the row address ROW_ADDR from the address register 230, and may receive the refresh row address REF_ADDR to be refreshed from the refresh address generator 290. The row address multiplexer 251 may selectively select one of the row address ROW_ADDR and the refresh row address REF_ADDR, and may output the selected row address to the row decoder 250 as a row address RA. The row address RA output from the row address multiplexer 251 may be applied to the first to eighth row decoders 250a-250h.

The row decoder 250 may select a row to be activated among the plurality of rows of the memory cell array 210 based on the row address ROW_ADDR or the refresh row address REF_ADDR. To this end, the row decoder 250 may apply a driving voltage to the word line corresponding to the row to be activated. In an embodiment, a plurality of row decoders 250a-250h respectively corresponding to the plurality of memory banks 210a-210h may be provided.

The column decoder 260 may select a column to be activated among the plurality of columns of the memory cell array 210 based on the column address COL_ADDR. To this end, the column decoder 260 may activate the sense amplifier 211 corresponding to the column address COL_ADDR through the I/O gating circuit 270. In an embodiment, a plurality of column decoders 260a-260h respectively corresponding to the plurality of memory banks 210a-210h may be provided.

The input/output gating circuit 270 may be a circuit that gates input/output data. In an embodiment, the I/O gating circuit 270 may include a data latch for storing data read from the memory cell array 210 and a write driver for writing data in the memory cell array 210. Data read from the memory cell array 210 may be sensed by the sense amplifier 211, and may be stored in the I/O gating circuit 270.

The sense amplifier 211 may sense the data read from the memory cell array 210. In an embodiment, a plurality of sense amplifiers 211a-211h respectively corresponding to the plurality of memory banks 210a-210h may be provided. For example, a codeword CW read from one memory cell array of the first to eighth memory banks 210a-210h may be sensed by the sense amplifiers 211a-211h corresponding to the memory cell array, and may be stored in the input/output gating circuit 270. The codeword CW may include a plurality of symbols. Each of the plurality of symbol may include a plurality of bits.

The data input/output buffer 280 may transmit data DQ to the ECC engine 300 when the memory device 20 performs the write operation. The data input/output buffer 280 may transmit data DQ received from the ECC engine 300 to the memory controller 100 when the memory device 20 performs the read operation. Additionally, the data input/output buffer 280 may transmit the decoding flag F_DEC received from a flag generator 500 to the memory controller 10 when the memory device 20 performs the read operation.

The ECC engine 300 may perform ECC encoding on write data to be written in the memory cell array 300 according to the ECC control signal CTRL_ECC. Specifically, the ECC engine 300 may generate parity bits for the write data. The ECC engine 300 may transmit data DQ and the parity bit to the input/output gating circuit 270. The input/output gating circuit 270 may write the data DQ and the parity bit in the memory cell array 210.

The ECC engine 300 may perform ECC decoding on read data read from the memory cell array 210 according to the ECC control signal CTRL_ECC. Specifically, the ECC engine 300 may perform ECC decoding on the codeword CW stored in the input/output gating circuit 270. For example, the ECC engine 300 may perform ECC decoding on the codeword CW read from each row of the memory cell array 210.

The ECC engine 300 may detect an error within the codeword CW. The ECC engine 300 may generate information on a location of the detected error and information on a value of the error. Specifically, the ECC engine 300 may generate an error locator polynomial ELP and an error evaluator polynomial EEP while performing the ECC decoding. In an embodiment, the error locator polynomial ELP may be a polynomial generated based on the location of the error within the codeword CW. In an embodiment, the error evaluator polynomial EEP may be a polynomial generated based on a data value of the error.

If the error is detected in the codeword CW, the ECC engine 300 may correct the error in the codeword CW based on the error locator polynomial ELP and the error evaluator polynomial EEP to generate corrected data CDQ. The ECC engine 300 may provide the corrected data CDQ to the memory controller 100 as data DQ through the data input/output buffer 280.

The ECC engine 300 may transmit the error locator polynomial ELP and the error evaluator polynomial EEP to the flag generator 500. Additionally, the ECC engine 300 may transmit the corrected data CDQ to the flag generator 500.

An eraser detector 400 may store vulnerable row data P_ERS for a vulnerable row in which an error is likely to occur. The vulnerable row within the memory cell array 210 may be preset in a process step of the memory device 20. For example, the vulnerable row data P_ERS may include a position of data corresponding to the vulnerable row. The vulnerable row data P_ERS may include a location of an estimation error within the codeword CW. For example, the location of the estimation error may be second data of a first symbol, third data of a second symbol, or the like. The eraser detector 400 may transfer the vulnerable row data P_ERS to the ECC engine 300. The ECC engine 300 may assume that an error occurs in data corresponding to a position included in the vulnerable row data P_ERS.

The ECC engine 300 may determine that an error occurs in data corresponding to the position within the codeword CW based on the vulnerable row data P_ERS, and may change a value of the data. The ECC engine 300 may generate the error locator polynomial ELP and the error evaluator polynomial EEP based on the vulnerable row data P_ERS. For example, the error locator polynomial ELP generated based on the vulnerable row data P_ERS may be a polynomial based not only on a location of an error that existed within the codeword CW but also on the location of the estimation error included in the vulnerable row data P_ERS. In addition, the error evaluator polynomial EEP generated based on the vulnerable row data P_ERS may be a polynomial based not only on a value of an error that existed within the codeword CW but also on a value of the estimation error included in the vulnerable row data P_ERS.

The ECC engine 300 may also transmit the vulnerable row data P_ERS to the flag generator 500. However, the present invention is not limited thereto, and the flag generator 500 may receive the vulnerable row data P_ERS from the eraser detector 400. In an embodiment, data for the vulnerable row within the eraser detector 400 may be updated at regular periods.

The flag generator 500 may generate the decoding flag F_DEC indicating a decoding state for the ECC decoding result. As described above, the memory device 20 may read data from the memory cell array 210, and may correct an error in the read data to output the corrected data CDQ as data DQ. The decoding state may indicate whether the data DQ is normal data or data including an uncorrectable error. Specifically, if the data DQ includes the uncorrectable error, the decoding state may be an uncorrectable error (UE). For example, if the data DQ includes an error exceeding correction capability of the ECC engine 300, the decoding state may be the UE. If the data DQ includes a correctable error, the decoding state may be a correctable error (CE). If the data DQ does not include an error, the decoding state may be a non-error (NE). Specifically, the flag generator 500 may generate the decoding flag F_DEC based on the error locator polynomial ELP, the error evaluator polynomial EEP, and the corrected data CDQ received from the ECC engine 300.

In an embodiment, the ECC engine 300 may correct an error using forward error correction (FEC) technology. Hereinafter, the ECC engine 300 is described as correcting the error using a Reed-Solomon (R-S) code, but the present invention is not limited thereto, and the ECC engine 300 may correct the error in various ways. The R-S code may be a non-binary cyclic code with a symbol including a sequence of m bits (m is an integer greater than 2). In the R-S code, selecting different parameters for the code gives different levels of protection and affects complexity of implementation. The R-S code may be described by a (n, k) code. Here, n is a length of the entire code, and k is a length of data. In other words, n-k may represent a length of parity. Additionally, the correction capability of the ECC engine 300 may be expressed as Equation 1.

$$t = \frac{n-k}{2} \qquad \text{(Equation 1)}$$

In Equation 1, t is the correction capability of the ECC engine, n is the length of the entire code, and k is the length of the data.

The correction capability of the ECC engine 300 may indicate the number of correctable bits in the entire code. Because the length of the entire code and the length of the data are preset, the correction capability of the ECC engine 300 may be preset.

On the other hand, if the location of the estimation error is preset based on the vulnerable row data P_ERS received from the eraser detector 400, the correction capability of the ECC engine 300 may be expressed as Equation 2.

$$t = \frac{n-k-e}{2} \qquad \text{(Equation 2)}$$

In Equation 2, t is the correction capability of the ECC engine, n is the length of the entire code, k is the length of the data, and e is the number of the preset errors.

As shown in Equation 2, the correction capability of the ECC engine 300 may be set by considering the number of errors whose locations are preset. For example, it is assumed that the length of the entire code is 16 and the length of the data is 8. In this case, because the correction capability of the ECC engine 300 is (16−8)/2, the correction capability of the ECC engine 300 may be 4. On the other hand, if it is assumed that there are two errors preset based on the vulnerable row data P_ERS, the correction capability of the ECC engine 300 may be (16−8−2)/2, so that the correction capability of the ECC engine 300 may be 3. However, because there are two preset errors, the ECC engine 300 may substantially correct five errors including two preset errors. In other words, the correction capability of the ECC engine 300 may be improved when the vulnerable row data P_ERS is considered compared with when the vulnerable row data P_ERS is not considered.

Figure 3:
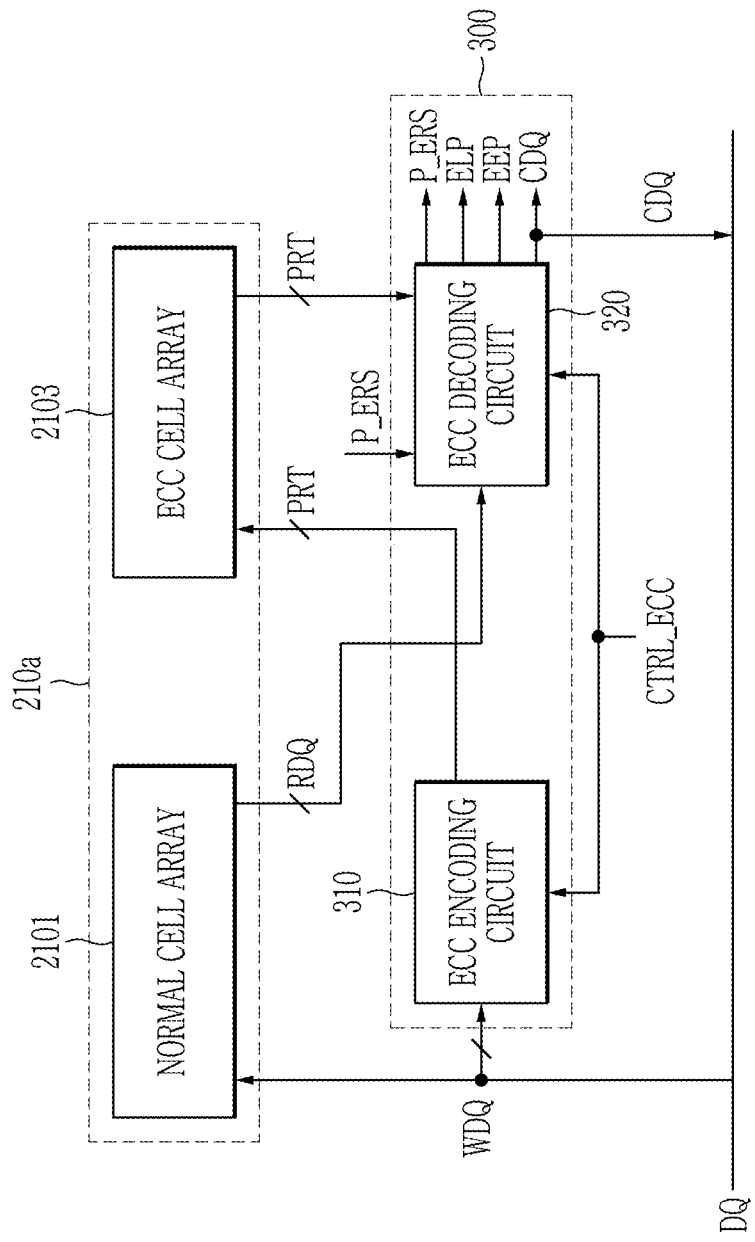
FIG. 3 is a view showing an ECC engine of FIG. 2 according to an embodiment.
Figure 4:
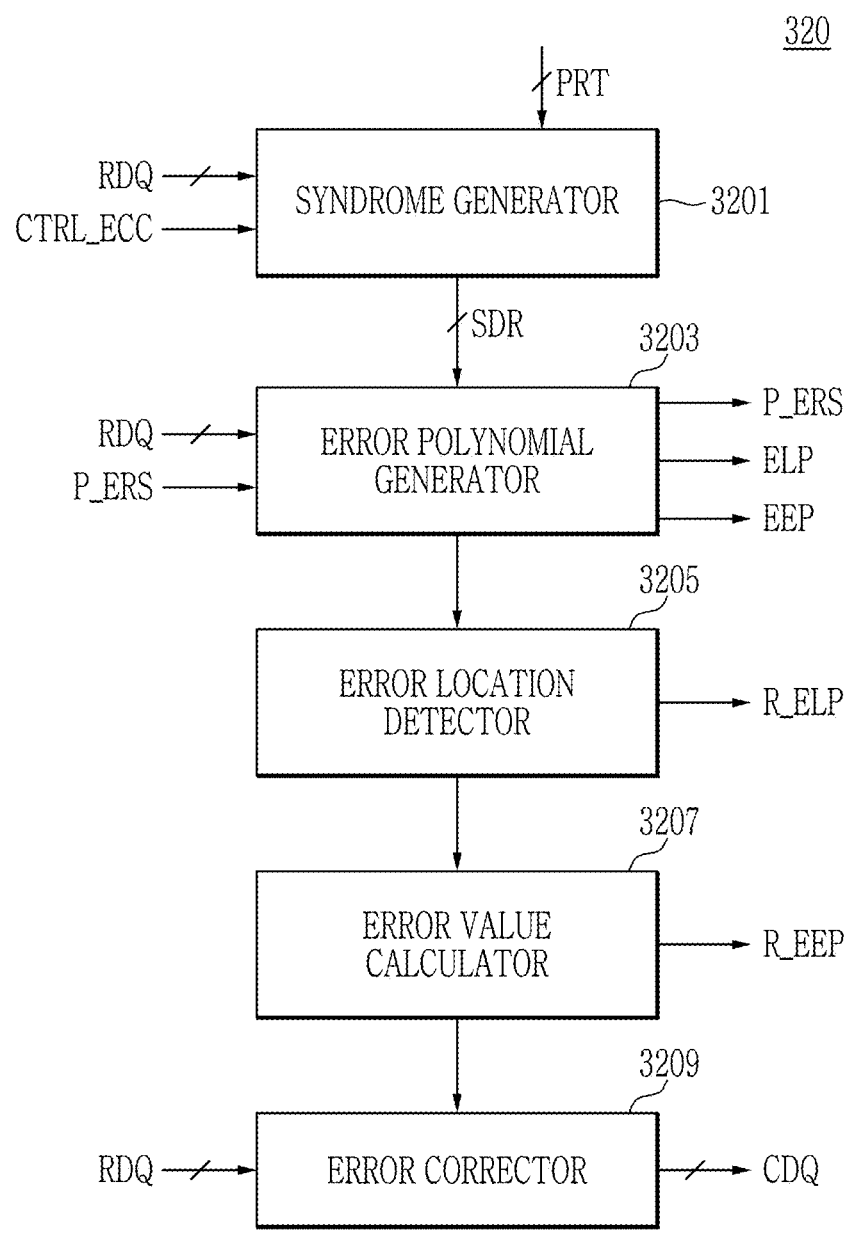
FIG. 4 is a view showing an ECC decoding circuit of FIG. 3 according to an embodiment.

FIG. 3 is a view showing the ECC engine of FIG. 2 according to an embodiment. FIG. 4 is a view showing an ECC decoding circuit according to an embodiment.

Referring to FIG. 3, the first memory bank 210a may include a normal cell array 2101 and an ECC cell array 2103.

The ECC engine 300 may include an ECC encoding circuit 310 and an ECC decoding circuit 320.

The ECC encoding circuit 310 may receive write data WDQ to be written. The ECC encoding circuit 310 may generate a parity bit PRT for the write data WDQ based on the ECC control signal CTRL_ECC. The ECC encoding circuit 310 may store the write data WDQ in a memory cell of the normal cell array 2101, and may store the parity bit PRT in a memory cell of the ECC cell array 2103.

Based on the ECC control signal CTRL_ECC, the ECC decoding circuit 320 may correct an error of read data RDQ using the read data RDQ read from the normal cell array 2101 and the parity bit PRT read from the ECC cell array 2103. The ECC decoding circuit 320 may output the corrected data CDQ in which the error is corrected. In an embodiment, the ECC decoding circuit 320 may further receive the vulnerable row data P_ERS from the eraser detector 400.

Referring to FIG. 4 together with FIG. 3, the ECC decoding circuit 320 may include a syndrome generator 3201, an error polynomial generator 3203, an error location detector 3205, an error value calculator 3207, and an error corrector 3209.

The syndrome generator 3201 may receive the read data RDQ and the parity bit PRT. The syndrome generator 3201 may also receive the vulnerable row data P_ERS. Because an error may be added in a process of storing and reading data in the memory cell array 210, the read data RDQ may include the error. The syndrome generator 3201 may generate a syndrome SDR for the read data RDQ to detect presence or absence of the error of the read data RDQ. In an embodiment, if the syndrome generator 3201 generates the syndrome SDR with a value of 0, it may be determined that the read data RDQ does not include the error. In an embodiment, if the syndrome generator 3201 generates the syndrome SDR having an arbitrary value other than 0, it may be determined that the read data RDQ includes the error. The syndrome generator 3201 may transfer the syndrome SDR to the error polynomial generator 3203.

The error polynomial generator 3203 may generate the error locator polynomial ELP using the read data RDQ and the syndrome SDR. Specifically, the error polynomial generator 3203 may calculate a coefficient of the error locator polynomial ELP using a Berlekamp-Massy (BM) algorithm for the syndrome SDR. On the other hand, the present invention is not limited thereto, and the error polynomial generator 3203 may calculate the coefficient of the error locator polynomial ELP using a Euclidean algorithm. Additionally, the error polynomial generator 3203 may generate the error evaluator polynomial EEP using the read data RDQ and the syndrome SDR.

In an embodiment, the error polynomial generator 3203 may generate the error locator polynomial ELP based on the read data RDQ, the syndrome SDR, and the vulnerable row data P_ERS. In an embodiment, the error polynomial generator 3203 may generate the error evaluator polynomial EEP based on the read data RDQ, the syndrome SDR, and the vulnerable row data P_ERS.

The error polynomial generator 3203 may transmit the error locator polynomial ELP and the error evaluator polynomial EEP to the flag generator 500 of FIG. 2. The error polynomial generator 3203 may transmit the vulnerable row data P_ERS to the flag generator 500.

The error location detector 3205 may obtain an error location R_ELP based on the error locator polynomial ELP. Specifically, the error location detector 3205 may obtain the error location R_ELP using a Chien search. The error locator polynomial ELP may indicate whether each of a plurality of symbols within the codeword CW includes an error. The error location R_ELP may indicate a location of the error within each symbol.

The error location detector 3205 may transmit the error location R_ELP to the flag generator 500.

The error value calculator 3207 may obtain an error value R_EEP based on the error evaluator polynomial EEP. Specifically, the error value calculator 3207 may obtain the error value R_EEP using a Forney algorithm that uses a differentiation of the error evaluator polynomial EEP.

The error value calculator 3207 may transmit the error value R_EEP to the flag generator 500.

The error corrector 3209 may generate the corrected data CDQ based on the read data RDQ and the error value R_EEP. In an embodiment, the error corrector 3209 may generate the corrected data CDQ by adding the error value R_EEP to a symbol at the error location R_ELP of the read data RDQ.

The error corrector 3209 may transmit the corrected data CDQ to the flag generator 500.

On the other hand, although FIG. 3 shows that the first memory bank 210a and the ECC engine 300 are connected, the present invention is not limited thereto, and the first memory bank 210a and the ECC engine 300 may be connected through the input/output gating circuit 270.

Figure 5:
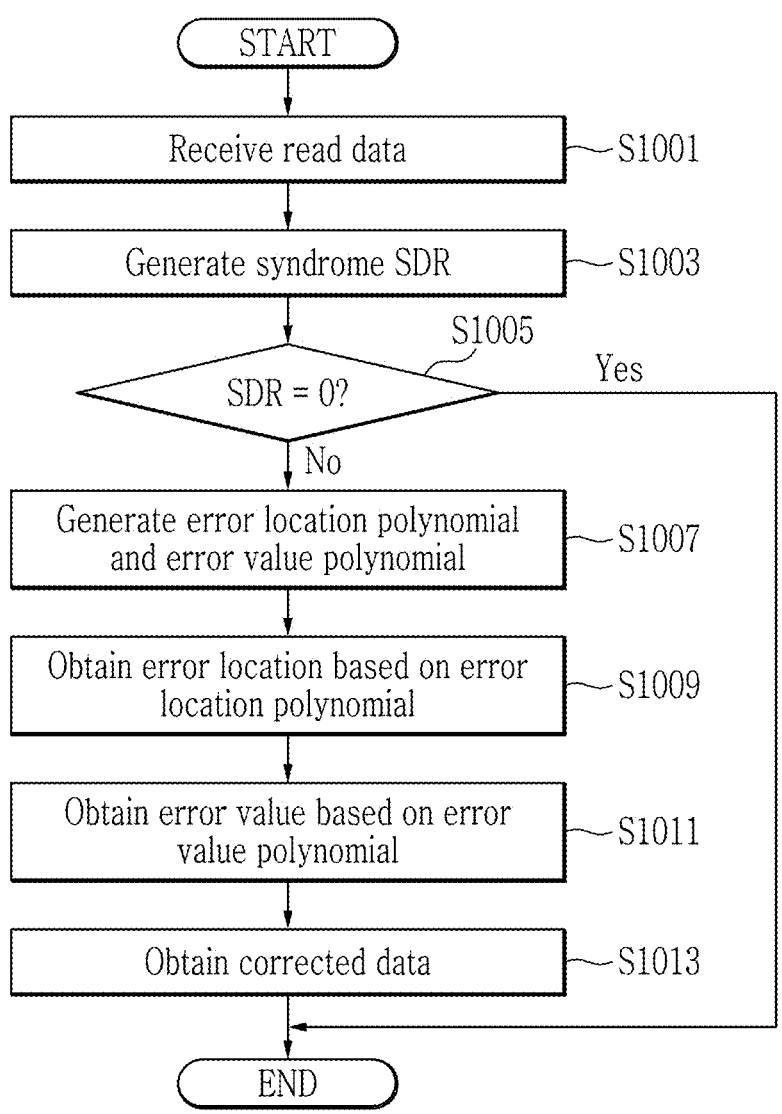
FIG. 5 is a view showing an ECC decoding operation of the ECC decoding circuit of FIG. 4 according to an embodiment.

FIG. 5 is a view showing an ECC decoding operation of the ECC decoding circuit of FIG. 4 according to an embodiment.

First, the syndrome generator 3201 receives the read data RDQ and the parity bit PRT (S1001).

The syndrome generator 3201 generates the syndrome SDR for the read data RDQ (S1003).

Specifically, the syndrome generator 3201 may generate the syndrome SDR based on the read data RDQ and the parity bit PRT corresponding to the read data RDQ. For example, the syndrome generator 3201 may generate the syndrome SDR using an XOR array operation.

The syndrome generator 3201 determines whether the syndrome SDR has a value of 0 (S1005).

If the syndrome SDR has the value of 0, the syndrome generator 3201 may determine that there is no error in the read data RDQ, and may end the ECC decoding operation. The ECC decoding circuit 320 may output the read data RDQ as data DQ.

If the syndrome SDR does not have the value of 0, the syndrome generator 3201 may transfer the syndrome SDR to the error polynomial generator 3203.

If the syndrome SDR does not have the value of 0, the error polynomial generator 3203 generates the error locator polynomial ELP and the error evaluator polynomial EEP (S1007).

The error polynomial generator 3203 may calculate a coefficient of the error locator polynomial ELP using the syndrome SDR. In an embodiment, the error polynomial generator 3203 may generate the error locator polynomial ELP further based on a location of the estimation error within the vulnerable row data P_ERS.

The error location detector 3205 obtains the error location R_ELP based on the error locator polynomial ELP (S1009).

In an embodiment, if the error location detector 3205 normally obtains the error location R_ELP, the error location R_ELP may include a location of the estimation error.

The error value calculator 3207 obtains the error value R_EEP based on the error evaluator polynomial EEP (S1011).

The error corrector 3209 obtains the corrected data CDQ (S1013).

Specifically, the error corrector 3209 may correct the read data RDQ based on the error location R_ELP and the error value R_EEP to generate the corrected data CDQ.

Figure 6:
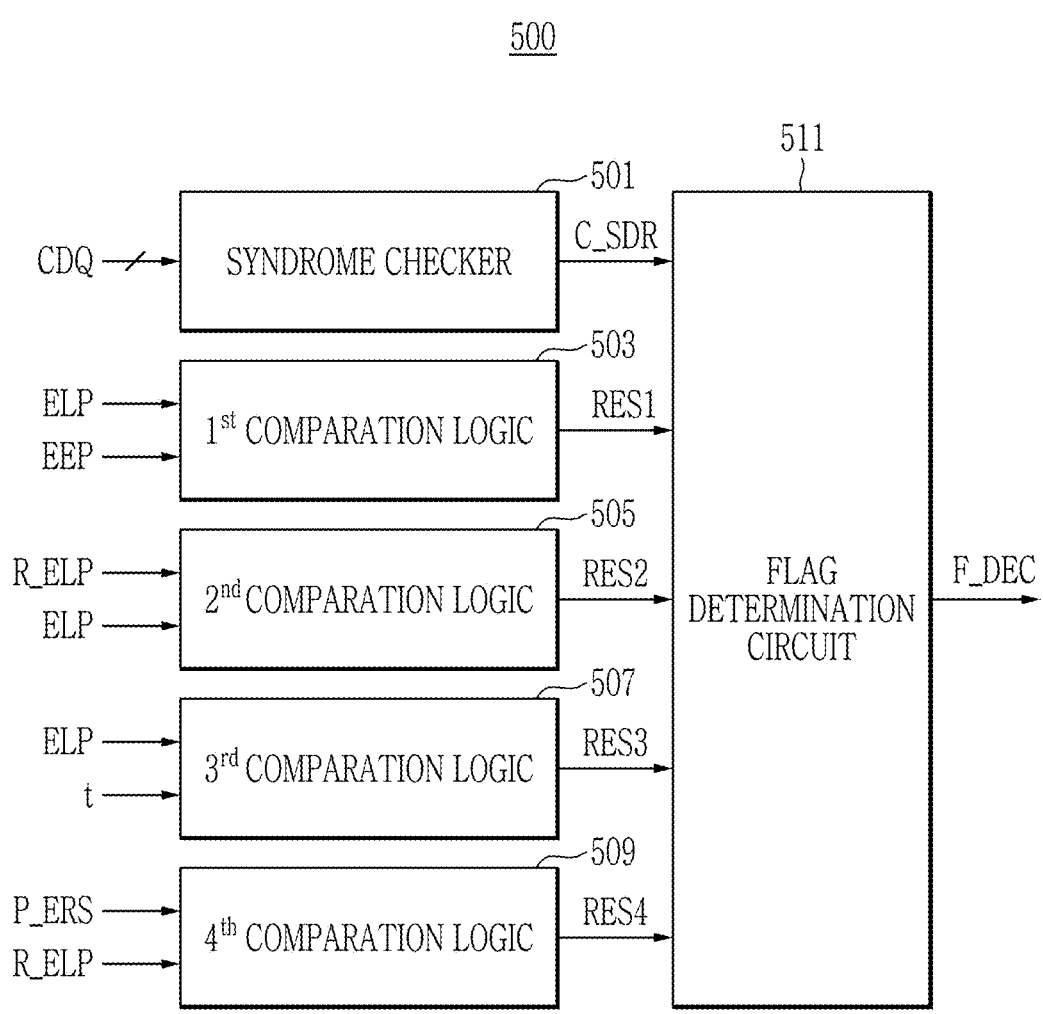
FIG. 6 is a view showing a flag generator of FIG. 2 according to an embodiment.

FIG. 6 is a view showing the flag generator of FIG. 2 according to an embodiment.

Referring to FIG. 6, the flag generator 500 may include a syndrome checker 501, a first comparison logic 503, a second comparison logic 505, a third comparison logic 507, and a fourth comparison logic 509. Additionally, the flag generator 500 may include a flag determination circuit 511.

The flag generator 500 may receive the error locator polynomial ELP, the error evaluator polynomial EEP, the error location R_ELP, the error value R_EEP, and the corrected data CDQ from the ECC engine 300. Additionally, the flag generator 500 may receive the vulnerable row data P_ERS from the ECC engine 300 or the eraser detector 400.

The syndrome checker 501 may calculate a correction syndrome for the corrected data CDQ, and may generate a correction syndrome signal C_SDR.

In an embodiment, if the correction syndrome calculated by the syndrome checker 501 has a value of 0, the syndrome checker 501 may determine that the corrected data CDQ does not include an error. In an embodiment, if the syndrome calculated by the syndrome checker 501 has an arbitrary value other than 0, it may be determined that the corrected data CDQ includes an error. The syndrome checker 501 may generate the correction syndrome signal C_SDR having an enable level if the correction syndrome has the arbitrary value other than 0. The syndrome checker 501 may generate the correction syndrome signal C_SDR having a disable level if the correction syndrome has the value of 0.

The syndrome checker 501 may transfer the correction syndrome signal C_SDR to the flag determination circuit 511.

The first comparison logic 503 may receive the error locator polynomial ELP and the error evaluator polynomial EEP. The first comparison logic 503 may compare a degree of the error locator polynomial ELP with a degree of the error evaluator polynomial EEP to generate a first result RES1. The first comparison logic 503 may generate the first result RES1 having an enable level if the degree of the error locator polynomial ELP is less than or equal to the degree of the error evaluator polynomial EEP. The first comparison logic 503 may generate the first result RES1 having a disable level if the degree of the error locator polynomial ELP is greater than the degree of the error evaluator polynomial EEP.

The first comparison logic 503 may transfer the first result RES1 to the flag determination circuit 511.

The second comparison logic 505 may receive the error location R_ELP and the error locator polynomial ELP. The second comparison logic 505 may generate a second result RES2 by comparing a degree of the error locator polynomial ELP with the number of error locations R_ELP. The second comparison logic 505 may generate the second result RES2 having an enable level if the degree of the error locator polynomial ELP and the number of the error locations R_ELP are different. The second comparison logic 505 may generate the second result RES2 having a disable level if the degree of the error locator polynomial ELP and the number of the error locations R_ELP are the same.

The second comparison logic 505 may transfer the second result RES2 to the flag determination circuit 511.

The third comparison logic 507 may receive the error locator polynomial ELP. The third comparison logic 507 may generate a third result RES3 by comparing a degree of the error locator polynomial ELP with the correction capability of the ECC engine 300. The third comparison logic 507 may generate the third result RES3 having an enable level if the degree of the error locator polynomial ELP exceeds the correction capability of the ECC engine 300. The third comparison logic 507 may generate the third result RES3 having a disable level if the degree of the error locator polynomial ELP is less than or equal to the correction capability of the ECC engine 300. Here, the correction capability of the ECC engine 300 may be determined based on the length of the entire code, the length of the data, and the number of the preset errors within the vulnerable row data P_ERS.

The third comparison logic 507 may transfer the third result RES3 to the flag determination circuit 511.

The fourth comparison logic 509 may receive the vulnerable row data P_ERS and the error location R_ELP. The fourth comparison logic 509 may generate a fourth result RES4 by comparing a location of the estimation error within the vulnerable row data P_ERS with the error location R_ELP. The fourth comparison logic 509 may generate the fourth result RES4 having an enable level if the error location R_ELP does not include the location of the estimation error within the vulnerable row data P_ERS. The fourth comparison logic 509 may generate the fourth result RES4 having a disable level if the error location R_ELP includes the location of the estimation error within the vulnerable row data P_ERS.

The fourth comparison logic 509 may transfer the fourth result RES4 to the flag determination circuit 511.

The flag determination circuit 511 may be connected to the syndrome checker 501, the first comparison logic 503, the second comparison logic 505, the third comparison logic 507, and the fourth comparison logic 509. In an embodiment, the flag determination circuit 511 may be an OR circuit. The flag determination circuit 511 may receive the correction syndrome C_SDR, the first result RES1, the second result RES2, the third result RES3, and the fourth result RES4, and if at least one of the correction syndrome C_SDR, the first result RES1, the second result RES2, the third result RES3, and the fourth result RES4 has an enable level, the decoding flag F_DEC having an enable level may be generated.

Figure 7:
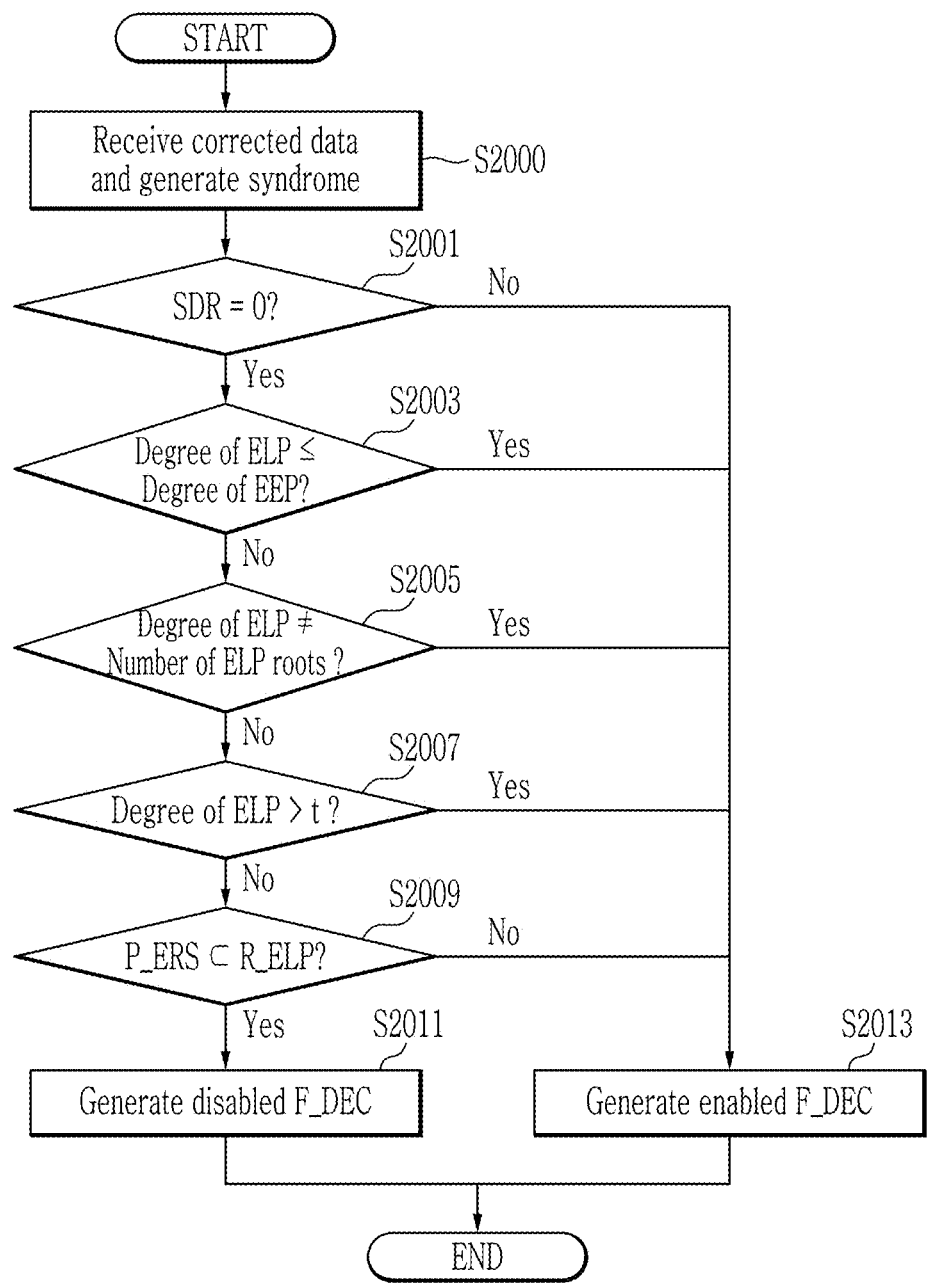
FIG. 7 is a view showing an operation of the flag generator of FIG. 6 according to an embodiment.

FIG. 7 is a view showing an operation of the flag generator of FIG. 6 according to an embodiment.

First, the syndrome checker 501 receives the corrected data CDQ and, generates the syndrome (S2000).

Specifically, the syndrome checker 501 may receive the corrected data CDQ from the ECC engine 300, and may generate the syndrome for the corrected data CDQ.

The syndrome checker 501 determines whether the generated syndrome has a value of 0 (S2001).

If the syndrome does not have the value of 0, the syndrome checker 501 generates the correction syndrome signal C_SDR having an enable level, and the flag determination circuit 511 generates the decoding flag F_DEC having an enable level (S2013).

If the syndrome has the value of 0, the syndrome checker 501 may determine that there is no error in the corrected data CDQ. Thereafter, the first comparison logic 503 compares a degree of the error locator polynomial ELP with a degree of the error evaluator polynomial EEP (S2003).

If the degree of the error locator polynomial ELP is less than or equal to the degree of the error evaluator polynomial EEP, the flag determination circuit 511 generates the decoding flag F_DEC having the enable level (S2013).

If the degree of the error locator polynomial ELP is greater than the degree of the error evaluator polynomial EEP, the second comparison logic 505 compares the degree of the error locator polynomial ELP with the number of error locations R_ELP.

If the degree of the error locator polynomial ELP and the number of the error locations R_ELP are different, the flag determination circuit 511 generates the decoding flag F_DEC having the enable level (S2013).

If the degree of the error locator polynomial ELP and the number of the error locations R_ELP are the same, the third comparison logic 507 compares the degree of the error locator polynomial ELP with the correction capability of the ECC engine 300 (S2007).

If the degree of the error locator polynomial ELP is greater than the correction capability of the ECC engine 300, the flag determination circuit 511 generates the decoding flag F_DEC having the enable level (S2013).

If the degree of the error locator polynomial ELP is less than or equal to the correction capability of the ECC engine 300, the fourth comparison logic 509 compares the location of the estimation error within the vulnerable row data P_ERS with the error location R_ELP.

If the error location R_ELP does not include the location of the estimation error within the vulnerable row data P_ERS, the flag determination circuit 511 generates the decoding flag F_DEC having the enable level (S2013).

If the error location R_ELP includes the location of the estimation error within the vulnerable row data P_ERS, the flag determination circuit 511 generates the decoding flag F_DEC having a disable level (S2011).

On the other hand, although FIG. 7 shows that the flag generator 500 sequentially performs each step, the present invention is not limited thereto, and the flag generator 500 may perform each step in an arbitrary order.

Figure 8:
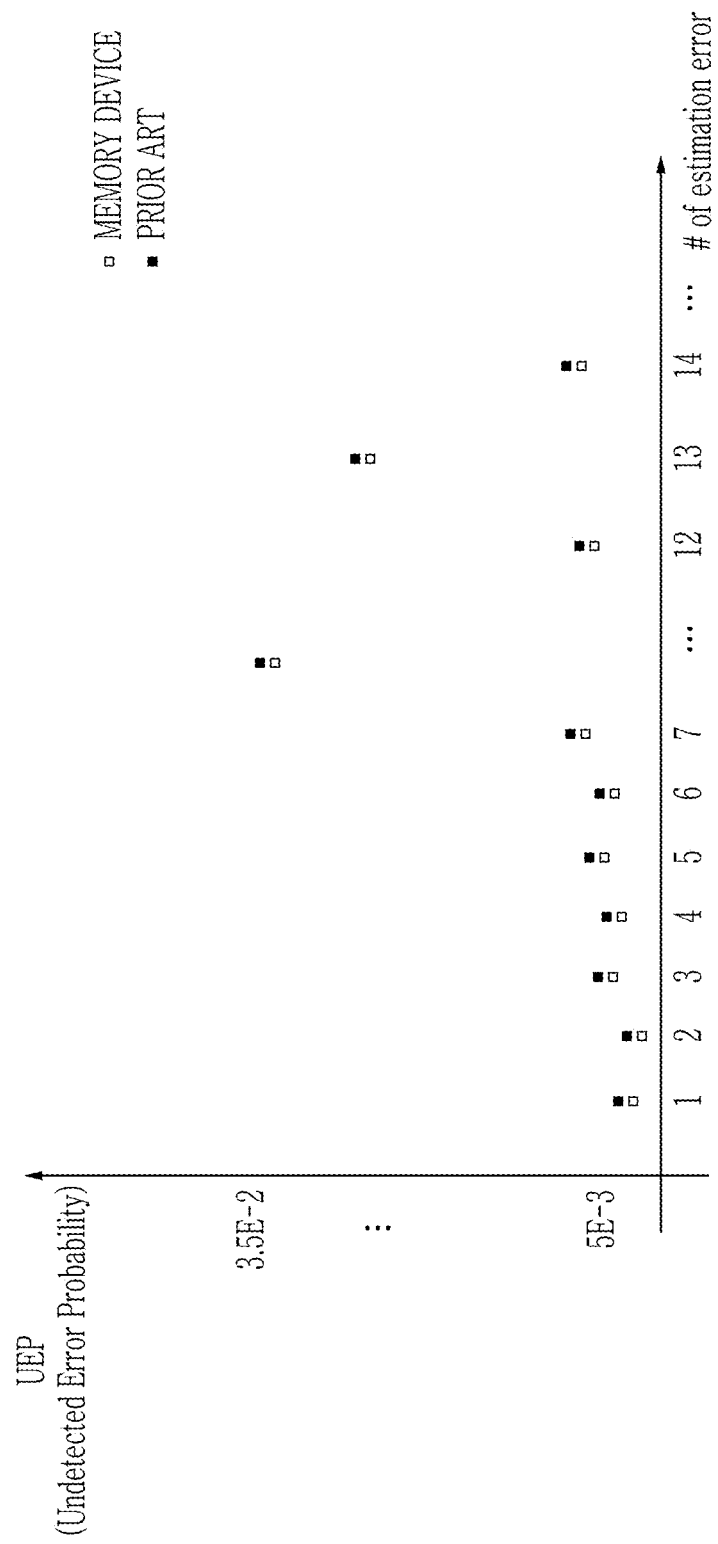
FIG. 8 is a graph showing a possibility of detecting an uncorrectable error of the memory device according to an embodiment.

FIG. 8 is a graph showing a possibility of detecting an uncorrectable error of the memory device according to an embodiment.

Specifically, FIG. 8 is the graph showing an undetected error probability (UEP) in which there will be the uncorrectable error that is not detected depending on the number of estimation errors stored in the vulnerable row data of the eraser detector. Here, the uncorrectable error may be an error of the data that exceeds correction capability of the memory device.

The memory device may determine whether the data include the uncorrectable error through a plurality of conditions, so that it easily detects a case where the data include the uncorrectable error.

As shown in FIG. 8, the memory device according to an embodiment may have a lower probability of not detecting the uncorrectable error compared with a memory device according to a prior art. In other words, the memory device according to the invention may have a higher probability of detecting the uncorrectable error compared with the memory device according to the prior art. Therefore, the memory device according to the embodiment may have a lower probability of occurrence of a Silent Data Corruption (SDC) phenomenon compared with the memory device according to the prior art.

Figure 9:
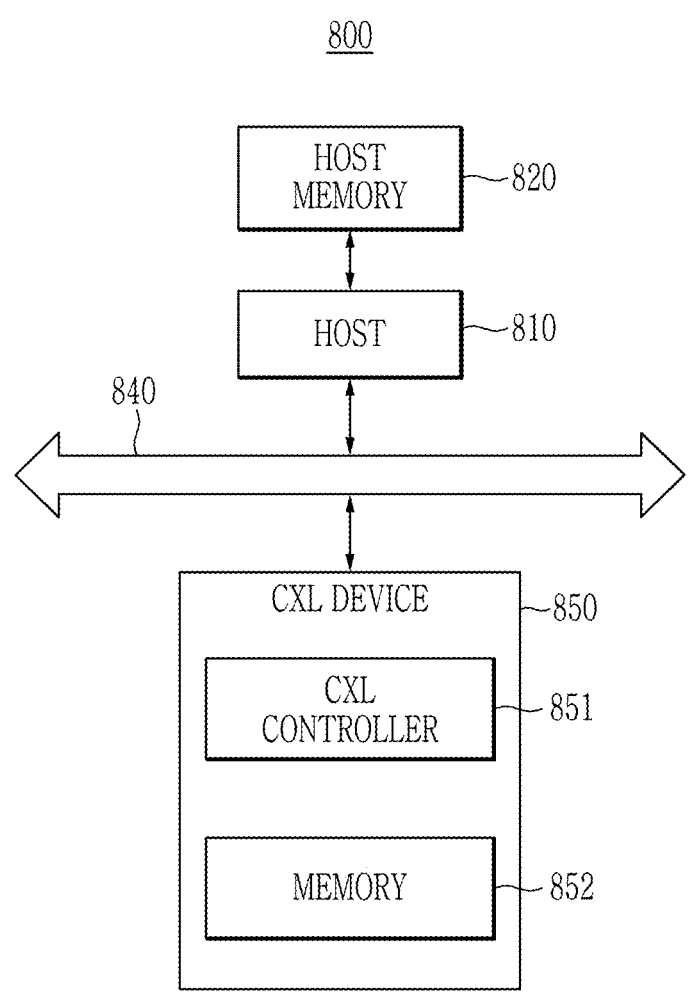
FIG. 9 is a view showing a computer system according to an embodiment.

FIG. 9 is a view showing a computer system according to an embodiment.

Referring to FIG. 9, the computer system 800 may include a host 810, a host memory 820, and a compute express link (CXL) device 850. The computer system 800 may include two or more CXL devices 850. In an embodiment, the computer system 800 may be included in a user device such as a personal computer (PC), a laptop computer, a server, a media player, a digital camera, or the like, or an automotive device such as a navigation, a black box, a vehicle electrical equipment, or the like. Alternatively, the computer system 800 may be a mobile system such as a mobile phone, a smart phone, a tablet personal computer (PC), a wearable device, a healthcare device, or an Internet of Things (IoT) device.

The host 810 may control an overall operation of the computer system 800. In an embodiment, the host 810 may be one of various processors such as a central processing unit (CPU), a graphics processing unit (GPU), a neural processing unit (NPU), a data processing unit (DPU), or the like. In an embodiment, the host 810 may include a single core processor or a multi-core processor.

The host 810 and the CXL device 850 may communicate with each other using CXL.mem that is a memory access protocol. The CXL.mem may be the memory access protocol that supports memory access. The host 810 may access a memory 852 within the CXL device 850 through CXL.mem.

Although FIG. 9 shows that the CXL device 850 includes one memory 852, the present invention is not limited thereto, and the CXL device 850 may include two or more memories. The host 810 may transmit a request indicating the memory 852 and including a memory identifier, a command, and an address to the CXL device 850. In an embodiment, the command may include an activate command, a read command, and a write command. The activate command may be a command that changes a target row of the memory 852 within the CXL device 850 to an active state in order to write data in the CXL device 850 or read data from the CXL device 850. The CXL device 850 may activate (e.g., drive) a memory cell of the target row in response to the activate command. The read/write command may be a command for performing a read or write operation in the target memory cell of the row changed to the active state.

The host 810 may transmit a request for the CXL device 850 through a CXL interface 840.

The host memory 820 may be used as a main memory or a system memory of the computer system 800. In an embodiment, the host memory 820 may be a dynamic random access memory (DRAM) device, and may have a form factor of a dual in-line memory module (DIMM). However, the present invention is not limited thereto, and the host memory 820 may include a nonvolatile memory such as a flash memory, a phase change RAM (PRAM), a resistive RAM (RRAM), a magnetoresistive RAM (MRAM), or the like.

In an embodiment, the host 810 may be directly connected to the host memory 820. In an embodiment, the host memory 820 may directly communicate with the host 810 through a DDR interface. In an embodiment, the host 810 may include a memory controller configured to control the host memory 820. However, the present invention is not limited thereto, and the host memory 820 may communicate with the host 810 through various interfaces.

The CXL device 850 may be implemented as an individual memory device or memory module. If there is a plurality of CXL devices 850, each of the plurality of CXL devices 850 may be connected to the CXL interface 840 through different physical ports. In other words, because the plurality of CXL devices 850 are connected to the CXL interface 840, a memory area managed by the host 810 may be increased in capacity.

The CXL device 850 may include a CXL controller 851 and the memory 852.

The CXL controller 851 may include an intellectual property (IP) circuit designed to implement an application specific integrated circuit (ASIC) and/or a field-programmable gate array (FPGA). In various embodiments, the CXL controller 851 may be implemented to support a CXL protocol (e.g., a CXL 2.0 protocol or any other version thereof). The CXL controller 851 may convert a CXL packet and signals of a memory interface of the memory 852 to each other. For example, the CXL controller 851 may convert a CXL packet transferred from the host 810 to a memory identifier, a command, an address, and data indicating the memory 852.

The CXL controller 851 may convert data received from the host 810 to store the converted data in the memory 852, or may convert data stored in the memory 852 to transmit the converted data to the host 810.

The memory 852 may include one of a dynamic random access memory (DRAM), a high bandwidth memory (HBM), a hybrid memory cube (HMC), a dual in-line memory module (DIMM), an optane DIMM, a non-volatile DIMM (NVMDIMM), a double data rate synchronous dynamic random access memory (DDR SDRAM), and a low-power double data rate synchronous dynamic random access memory (LPDDR SDRAM), or a combination thereof.

In an embodiment, the memory 852 may be the memory device described with reference to FIGS. 1 to 7. The memory 852 may perform ECC decoding if the data stored in the memory 852 are read. The memory 852 may determine whether the data include an uncorrectable error using a plurality of values generated if the ECC decoding is performed. In an embodiment, a position of data where an error is likely to occur in the data read from the memory 852 may be set in advance as an estimation error.

For example, the memory 852 may determine whether the data include the uncorrectable error based on at least one of a value of a correction syndrome calculated for correction data generated by performing the ECC decoding on the read data, a result of comparing a degree of the error locator polynomial ELP with a degree of the error evaluator polynomial EEP, a result of comparing the degree of the error locator polynomial ELP with the number of solutions of the error locator polynomial ELP, a result of comparing the degree of the error locator polynomial ELP with correction capability of the memory 852, and a result of comparing a location of the estimation error with locations of the solutions of the error locator polynomial ELP.

Because the memory 852 determines whether the data include the uncorrectable errors through a plurality of conditions, it may easily detect a case where the data include the uncorrectable error. Accordingly, reliability of the data stored in the memory 852 may be improved.

In an embodiment, the host 810 and the CXL device 850 may be configured to share the same interface. For example, the host 810 and the CXL device 850 may communicate with each other through the CXL interface 840. In an embodiment, the CXL interface 840 may be a low-latency and high-bandwidth link that supports consistency, memory access, and dynamic protocol multiplexing of an input/output (IO) protocol to enable various connections between accelerators, memory devices, or various electronic devices.

In an embodiment, the host 810 may communicate with the CXL device 850 through the CXL interface 840.

The host 810 and the CXL device 850 may communicate with each other through the CXL interface 840. However, the present invention is not limited thereto, and the host 810 and the CXL device 850 may communicate with each other based on various computing interfaces such as a GEN-Z protocol, an NVLink protocol, a CCIX protocol, an Open CAPI protocol, and the like.

Figure 10:
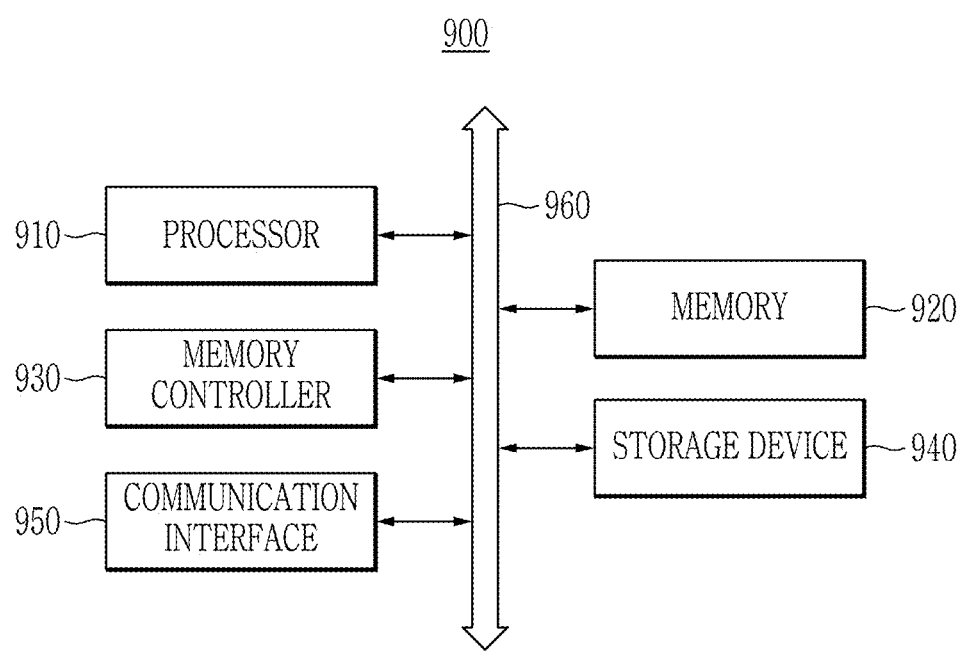
FIG. 10 is an example block diagram showing a computing device according to an embodiment.

FIG. 10 is an example block diagram showing a computing device according to an embodiment.

Referring to FIG. 10, the computing device 900 includes a processor 910, a memory 920, a memory controller 930, a storage device 940, a communication interface 950, and a bus 960. The computing device 900 may further include another general-purpose component.

The processor 910 controls an overall operation of each configuration of the computing device 900. The processor 910 may be implemented as at least one of various processing units such as a central processing unit (CPU), an application processor (AP), a graphics processing unit (GPU), and the like.

The memory 920 stores various data and commands. The memory 920 may be implemented as the memory device described with reference to FIGS. 1 to 7.

The memory 920 may perform ECC decoding if the data stored in the memory 920 are read. The memory 920 may determine whether the data include an uncorrectable error using a plurality of values generated if the ECC decoding is performed. In an embodiment, a position of data where an error is likely to occur in the data read from the memory 920 may be set in advance as an estimation error.

For example, the memory 920 may determine whether the data include the uncorrectable error based on at least one of a value of a correction syndrome calculated for correction data generated by performing the ECC decoding on the read data, a result of comparing a degree of the error locator polynomial ELP with a degree of the error evaluator polynomial EEP, a result of comparing the degree of the error locator polynomial ELP with the number of solutions of the error locator polynomial ELP, a result of comparing the degree of the error locator polynomial ELP with correction capability of the memory 920, and a result of comparing a location of the estimation error with locations of the solutions of the error locator polynomial ELP.

Because the memory 920 determines whether the data include the uncorrectable errors through a plurality of conditions, it may easily detect a case where the data include the uncorrectable error. Accordingly, reliability of the data stored in the memory 920 may be improved.

In an embodiment, the memory controller 930 may be provided as a separate chip from the processor 910. In an embodiment, the memory controller 930 may be provided as an internal configuration of the processor 910.

The storage device 940 non-temporarily stores a program and data. In an embodiment, the storage device 940 may be implemented as a nonvolatile memory.

The communication interface 950 supports wired/wireless Internet communication of the computing device 900. Additionally, the communication interface 950 may support various communication methods other than Internet communication.

The bus 960 provides a communication function between components of the computing device 900. The bus 960 may include at least one type of bus depending on a communication protocol between the components.

Figure 11:
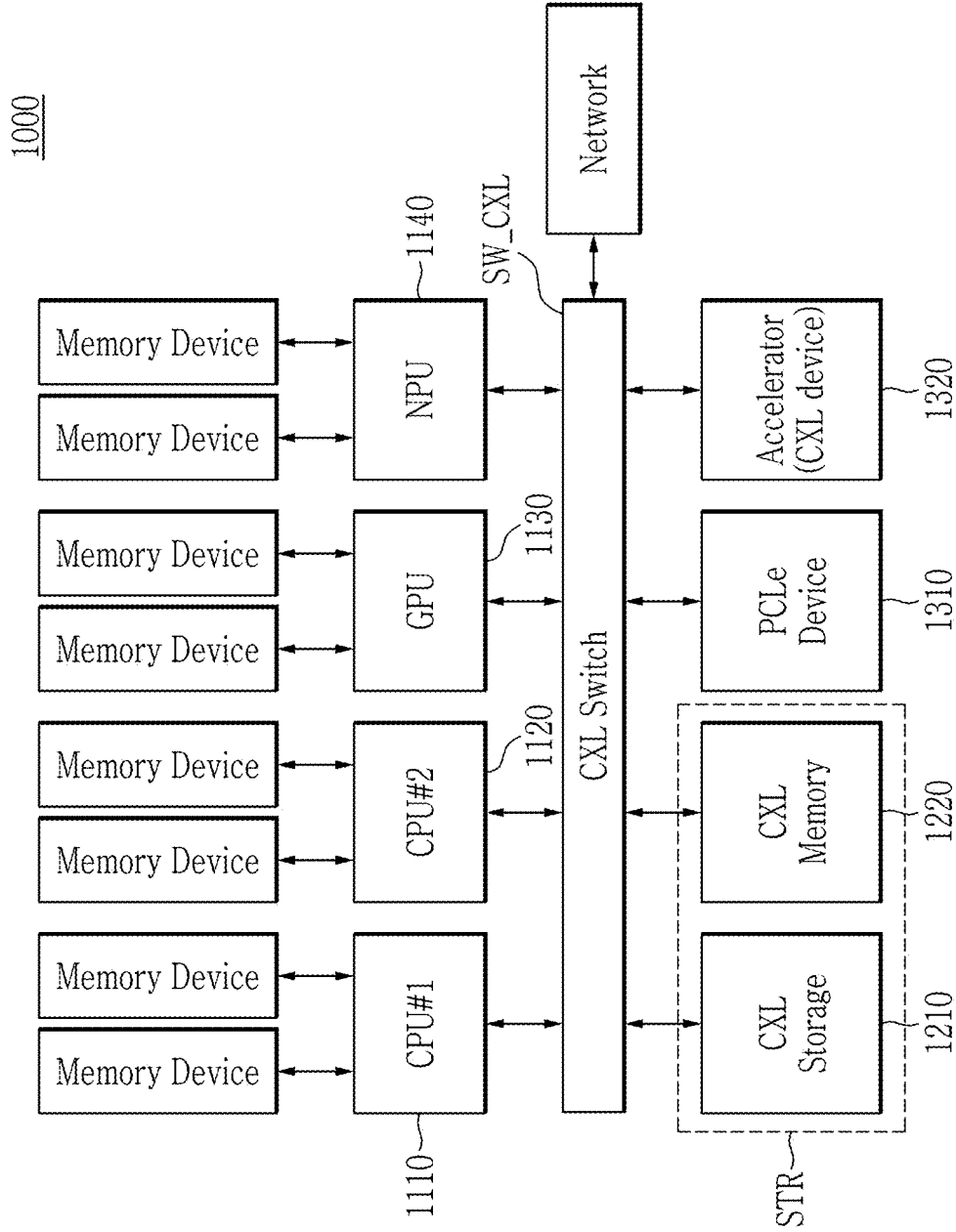
FIG. 11 is a block diagram showing a computer system according to an embodiment.

FIG. 11 is a block diagram showing a computer system according to an embodiment.

For convenience of description, detailed descriptions of the components described above are omitted. Referring to FIG. 11, the computer system 1000 may include a first CPU 1110, a second CPU 1120, a GPU 1130, an NPU 1140, a CXL switch SW_CXL, a CXL storage 1210, a CXL memory 1220, a PCIe device 1310, and an accelerator 1320.

The first CPU 1110, the second CPU 1120, the GPU 1130, the NPU 1140, the CXL storage 1210, the CXL memory 1220, the PCIe device 1310, and the accelerator 1320 may be connected in common to the CXL switch SW_CXL, and may communicate with each other through the CXL switch SW_CXL.

In an embodiment, each of the first CPU 1110, the second CPU 1120, the GPU 1130, and the NPU 1140 may be directly connected to individual memory devices. The CXL storage 1210 and the CXL memory 1220 may be used as a storage space STR of the computer system 1000.

The CXL storage 1210 may store data received through the CXL switch SW_CXL from one or more of the first CPU 1110, the second CPU 1120, the GPU 1130, and the NPU 1140, or may output the stored data. At least some areas of the CXL memory 1220 may be allocated as a dedicated area of the CXL storage 1210, and the CXL storage 1210 may use the dedicated area as a buffer memory.

In an embodiment, the CXL memory 1220 may be the memory device described with reference to FIGS. 1 to 7. The CXL memory 1220 may store data received through the CXL switch SW_CXL from one or more of the first CPU 1110, the second CPU 1120, the GPU 1130, and the NPU 1140.

The CXL memory 1220 may perform ECC decoding if the data stored in the CXL memory 1220 are read. The CXL memory 1220 may determine whether the data include an uncorrectable error using a plurality of values generated if the ECC decoding is performed. In an embodiment, a position of data where an error is likely to occur in the data read from the CXL memory 1220 may be set in advance as an estimation error.

For example, the CXL memory 1220 may determine whether the data include the uncorrectable error based on at least one of a value of a correction syndrome calculated for correction data generated by performing the ECC decoding on the read data, a result of comparing a degree of the error locator polynomial ELP with a degree of the error evaluator polynomial EEP, a result of comparing the degree of the error locator polynomial ELP with the number of solutions of the error locator polynomial ELP, a result of comparing the degree of the error locator polynomial ELP with correction capability of the CXL memory 1220, and a result of comparing a location of the estimation error with locations of the solutions of the error locator polynomial ELP.

Because the CXL memory 1220 determines whether the data include the uncorrectable errors through a plurality of conditions, it may easily detect a case where the data include the uncorrectable error. Accordingly, reliability of the data stored in the CXL memory 1220 may be improved.

In an embodiment, the CXL switch SW_CXL may be connected to the PCIe device 1310 or the accelerator 1320 configured to support various functions, and the PCIe device 1310 or the accelerator 1320 may communicate with each of the first CPU 1110, the second CPU 1120, the GPU 1130, and the NPU 1140 through the CXL switch SW_CXL, or may access the storage space STR including the CXL storage 1210 and the CXL memory 1220.

In an embodiment, the CXL switch SW_CXL may be connected to an external network or fabric, and may be configured to communicate with an external server through the external network or fabric.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the present invention as set forth in the appended claims.

What is claimed is:

1. A memory device comprising:
   a memory cell array including a plurality of memory cells arranged in a plurality of rows;
   an eraser detector configured to store vulnerable row data including a location of an estimation error corresponding to a vulnerable row among the plurality of rows;
   an error correction code (ECC) engine configured to decode first data read from the memory cell array based on the vulnerable row data to generate information on a first error included in the first data in response to a read command and corrects the first error to generate second data; and
   a flag generator configured to generate a decoding flag indicating a decoding state of the ECC engine based on the vulnerable row data, the information on the first error, and the second data.

2. The memory device of claim 1, wherein the flag generator comprises:
   a syndrome checker configured to generate a second syndrome for the second data; and
   a flag determination circuit configured to generate the decoding flag indicating that the first error is an uncorrectable error if the second syndrome does not have a value of 0.

3. The memory device of claim 1, wherein the ECC engine comprises:
   a syndrome generator configured to generate a first syndrome for the first data; and
   an error polynomial generator configured to generate an error locator polynomial (ELP) indicating a location of the first error based on the first data, the first syndrome, and the vulnerable row data,
   wherein the information on the first error includes the error locator polynomial.

4. The memory device of claim 3, wherein the error polynomial generator is configured to calculate a coefficient of the error locator polynomial using a Berlekamp-Massy (BM) algorithm.

5. The memory device of claim 3, wherein correction capability indicating the number of correctable bits in the first data is predetermined, and
   wherein the flag generator includes:
   a first comparison logic configured to compare a degree of the error locator polynomial with the correction capability and generate a first result having an enable level if the degree of the error locator polynomial exceeds the correction capability, and
   a flag determination circuit configured to generate the decoding flag indicating that the first error is an uncorrectable error based on the first result having the enable level.

6. The memory device of claim 3, wherein the ECC engine includes an error location detector configured to obtain the location of the first error from the error locator polynomial using a Chien search.

7. The memory device of claim 6, wherein the flag generator comprises:
   a second comparison logic configured to compare the location of the estimation error with the location of the first error and generate a second result having an enable level if the location of the first error does not include the location of the estimation error; and
   a flag determination circuit configured to generate the decoding flag indicating that the first error is an uncorrectable error based on the second result having the enable level.

8. The memory device of claim 6, wherein the flag generator comprises:
   a third comparison logic configured to compare a degree of the error locator polynomial with the number of locations of the first error and generate a third result having an enable level if the degree of the error locator polynomial and the number of locations of the first error are different; and
   a flag determination circuit configured to generate the decoding flag indicating that the first error is an uncorrectable error based on the third result having the enable level.

9. The memory device of claim 3, wherein the ECC engine includes:
   an error polynomial generator configured to generate an error evaluator polynomial (EEP) indicating a data value of the first error based on the first data, the first syndrome, and the vulnerable row data, and the information on the first error includes the error evaluator polynomial.

10. The memory device of claim 9, wherein the flag generator comprises:
    a fourth comparison logic configured to compare a degree of the error locator polynomial with a degree of the error evaluator polynomial and generate a first result having an enable level if the degree of the error locator polynomial is less than or equal to the degree of the error evaluator polynomial; and
    a flag determination circuit configured to generate the decoding flag indicating that the first error is an uncorrectable error based on the first result having the enable level.

11. An operating method of a memory device including a memory cell array, the operating method comprising:
    receiving first data read from the memory cell array including a plurality of memory cells arranged in a plurality of rows in response to a read command;
    generating a first syndrome for the first data;
    generating information on a first error included in the first data based on the first syndrome and vulnerable row data including a location of an estimation error corresponding to a vulnerable row among the plurality of rows;
    generating second data by correcting the first error; and
    generating a decoding flag indicating a decoding state based on the vulnerable row data, the information on the first error, and the second data.

12. The operating method of claim 11, wherein the generating of the decoding flag includes generating a second syndrome for the second data and generating the decoding flag indicating that the first error is an uncorrectable error if the second syndrome does not have a value of 0.

13. The operating method of claim 11, wherein the generating of the information on the first error comprises:
generating the first syndrome for the first data;
generating an error locator polynomial (ELP) indicating a location of the first error based on the first data, the first syndrome, and the vulnerable row data;
generating an error evaluator polynomial (EEP) indicating a data value of the first error based on the first data, the first syndrome, and the vulnerable row data; and
obtaining the location of the first error based on the error locator polynomial.

14. The operating method of claim 13, wherein the generating of the decoding flag comprises:
comparing a degree of the error locator polynomial with correction capability indicating the number of correctable bits in the first data; and
generating the decoding flag indicating that the first error is an uncorrectable error if the degree of the error locator polynomial exceeds the correction capability.

15. The operating method of claim 14, wherein the generating of the decoding flag comprises:
comparing the location of the estimation error with the location of the first error; and
generating the decoding flag indicating that the first error is the uncorrectable error if the location of the first error does not include the location of the estimation error.

16. The operating method of claim 14, wherein the generating of the decoding flag comprises:
comparing the degree of the error locator polynomial with the number of locations of the first error; and
generating the decoding flag indicating that the first error is the uncorrectable error if the degree of the error locator polynomial and the number of locations of the first error are different.

17. The operating method of claim 14, wherein the generating of the decoding flag comprises:
comparing the degree of the error locator polynomial with a degree of the error evaluator polynomial; and
generating the decoding flag indicating that the first error is the uncorrectable error if the degree of the error locator polynomial is less than or equal to the degree of the error evaluator polynomial.

18. A memory system comprising:
a memory controller configured to transmit a read command and receive a decoding flag indicating a decoding state of a memory device in response to the read command; and
a memory device including a memory cell array having a plurality of memory cells arranged in a plurality of rows, and the memory device configured to:
read first data from the memory cell array in response to the read command,
decode the first data based on vulnerable row data including a location of an estimation error corresponding to a vulnerable row among the plurality of rows to generate information on a first error included in the first data,
correct the first error to generate second data, and
generate the decoding flag indicating the decoding state based on the vulnerable row data, the information on the first error, and the second data.

19. The memory system of claim 18, wherein the memory device is configured to generate a second syndrome for the second data and generate the decoding flag indicating that the first error is an uncorrectable error if the second syndrome does not have a value of 0.

20. The memory system of claim 19, wherein the memory device is configured to generate:
an error locator polynomial (ELP) indicating a location of the first error based on the first data, a first syndrome generated based on the first data, and the vulnerable row data, and
the decoding flag indicating that the first error is the uncorrectable error if a degree of the error locator polynomial exceeds correction capability indicating the number of correctable bits in the first data or the location of the first error does not include the location of the estimation error.

* * * * *